United States Patent [19]

Fan

[11] Patent Number: 5,841,850

[45] Date of Patent: Nov. 24, 1998

[54] INTELLIGENT CALLER IDENTIFICATION APPARATUS FOR NOTIFYING A SELECTED TELEPHONE NUMBER OF THE ARRIVAL OF SPECIAL INFORMATION

[76] Inventor: Yuan-Neng Fan, 15045 N. 49th St., Scottsdale, Ariz. 85254

[21] Appl. No.: 829,148

[22] Filed: Mar. 31, 1997

[51] Int. Cl.[6] .............................. H04M 1/56; H04M 15/06
[52] U.S. Cl. .................. 379/142; 379/93.23; 379/100.08
[58] Field of Search .................................... 379/127, 142, 379/354, 118, 120, 122, 117, 93.23, 93.24, 130, 100.08

[56] References Cited

U.S. PATENT DOCUMENTS

| | | | |
|---|---|---|---|
| 5,363,429 | 11/1994 | Fusijawa | 379/142 |
| 5,502,761 | 3/1996 | Duncan et al. | 379/142 |
| 5,602,908 | 2/1997 | Fan | 379/142 |
| 5,608,788 | 3/1997 | Demlow et al. | 379/142 |
| 5,644,629 | 7/1997 | Chow | 379/142 |
| 5,703,936 | 12/1997 | Tsuchida et al. | 379/142 |
| 5,724,412 | 3/1998 | Srinivisan | 379/142 |
| 5,737,400 | 4/1998 | Bagchi et al. | 379/142 |
| 5,771,281 | 6/1998 | Batten | 379/142 |
| 5,781,613 | 7/1998 | Knujth et al. | 379/142 |
| 5,787,157 | 7/1998 | Garfin et al. | 379/142 |

*Primary Examiner*—Curtis A. Kuntz
*Assistant Examiner*—Rexford N. Barnie
*Attorney, Agent, or Firm*—Harry M. Weiss; Jeffrey D. Moy; Harry M. Weiss & Associates, P.C.

[57] ABSTRACT

An intelligent caller identification apparatus for notifying a selected telephone number of the arrival of special electronic information. An information/internet service provider (ISP) calls a subscriber when an electronic communication has arrived. A microcontroller is used to compare the incoming telephone number to telephone numbers stored in an ISP database. If the incoming telephone number matches information stored in the ISP database, an information indicator circuit is set to inform the user of the arrival of an electronic communication. A ringing control circuit is used to prevent the telephone set from ringing when the incoming telephone number matches an ISP telephone number. The ringing control circuit thereby prevents the user from answering the incoming telephone call when the incoming telephone call is for notification of an electronic information delivery.

21 Claims, 3 Drawing Sheets

INTELLIGENT CALLER IDENTIFICATION APPARATUS FOR NOTIFYING A SELECTED TELEPHONE NUMBER OF THE ARRIVAL OF SPECIAL INFORMATION

BACKGROUND OF THE INVENTION

1. Field of the Invention

This invention relates generally to telephone systems and, more specifically, to an intelligent caller identification apparatus which is able to notify a selected telephone number of the arrival of special information (i.e., electronic mail (E-Mail)).

2. Description of the Prior Art

Presently, there are numerous types of caller identification (Caller ID) systems. Under these systems, when an incoming call is detected, the telephone number where the call is being made, as well as information identifying the calling party, is displayed on a monitor. While these systems do work, there are several problems associated with these systems.

In the past several years, electronic communication has become a popular form of communication for many individuals. Many people use electronic mail (E-Mail) to communicate with friends or family throughout the world. Furthermore, many industries use electronic communication as a verification of services performed. For example, many banks use electronic communication to verify wire fund transfers or electronic deposit information. The problem with current Caller ID systems is that they are unable to signal a user when he or she has an incoming electronic message. Currently, an E-Mail user is unaware of an incoming E-Mail message prior to logging onto an E-Mail or internet service server. This is very inconvenient, especially if the user is expecting an important E-Mail message and the user does not have frequent access to an E-Mail or internet service server.

Therefore, a need existed to provide an improved caller ID system. The improved caller ID system would be an intelligent caller ID system which would be able to assist a user in determining the arrival of electronic information from an information/internet service provider. The intelligent caller ID system will compare the telephone number of an incoming call to a database to determine if the incoming call is from an information/internet service provider. If the incoming call is from an information/internet service provider, an indicator circuit on the intelligent caller ID system will signal the user of an incoming electronic communication. If the incoming call is not from an information/internet service provider, the intelligent caller ID system will allow the telephone set to ring so that the user of the system may answer the telephone.

SUMMARY OF THE INVENTION

In accordance with one embodiment of the present invention, it is an object of this invention to provide an improved caller ID system.

It is another object of the present invention to provide an improved caller ID system which is an intelligent caller ID system that is able to assist a user in determining the arrival of electronic information from a information/internet service provider.

It is still another object of the present invention to provide an intelligent caller ID system that will compare the telephone number of an incoming telephone call to a database to determine if the incoming call is from an information/internet service provider.

It is still a further object of the present invention to provide an intelligent caller ID system that will signal the user of an incoming electronic communication if the incoming telephone call is from an information/internet service provider.

It is still a further object of the present invention to provide an intelligent caller ID system that will compare the telephone number of an incoming call to a database to determine if the incoming call is from an information/internet service provider and which will allow the telephone set to ring so that the user of the system may answer the telephone set if the incoming telephone call is not from an information/internet service provider.

BRIEF DESCRIPTION OF THE PREFERRED EMBODIMENTS

In accordance with one embodiment of the present invention, an intelligent caller identification apparatus for notifying a selected telephone number of the arrival of special information. The apparatus has a ringing detector circuit which is coupled to a telephone line of a selected telephone service provider. The ringing detector circuit is used for receiving an incoming telephone call which has been made to the selected telephone number. A ringing control circuit is also coupled to the telephone line as well as to a telephone set. The ringing control circuit is used for signalling the telephone set to ring when the incoming call to the selected telephone number has been received. A caller identification receiver is also coupled to the telephone line. The caller identification receiver is used for decoding identification information of the incoming telephone call to the selected telephone number. A microprocessor is coupled to the ringing detector circuit, the ringing control circuit, and the caller identification receiver. The microprocessor is used for disabling the ringing control circuit immediately after the ringing detector circuit detects the incoming telephone call to the selected telephone number, for comparing the identification information of the incoming telephone call to a list of information service providers, and for generating an incoming message signal and for continuing to disable the ringing control circuit when the identification information of the incoming telephone call matches data of at least one information service provider on the list of information service providers otherwise the microprocessor will enable the ringing control circuit to signal the telephone set to ring to indicate that the incoming telephone call is from a noninformation service provider.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
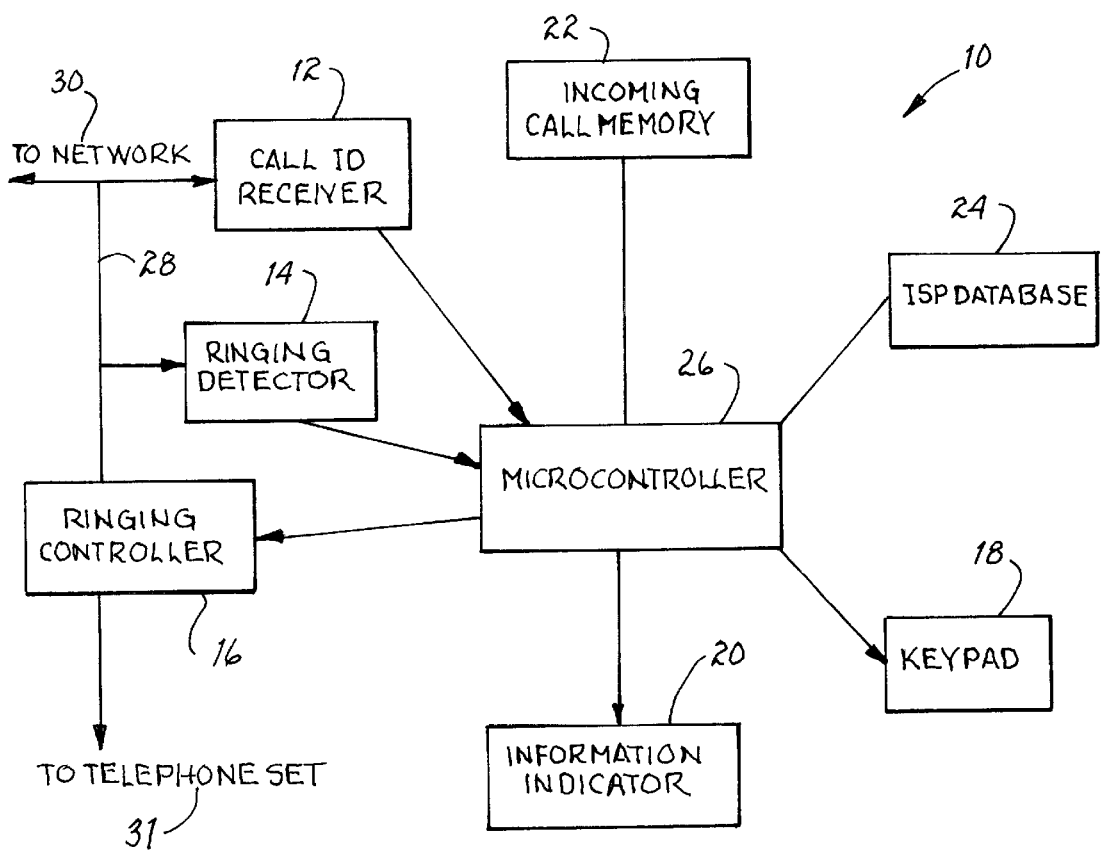
FIG. 1 is a simplified functional block diagram of the intelligent caller identification apparatus of the present invention.
Figure 2:
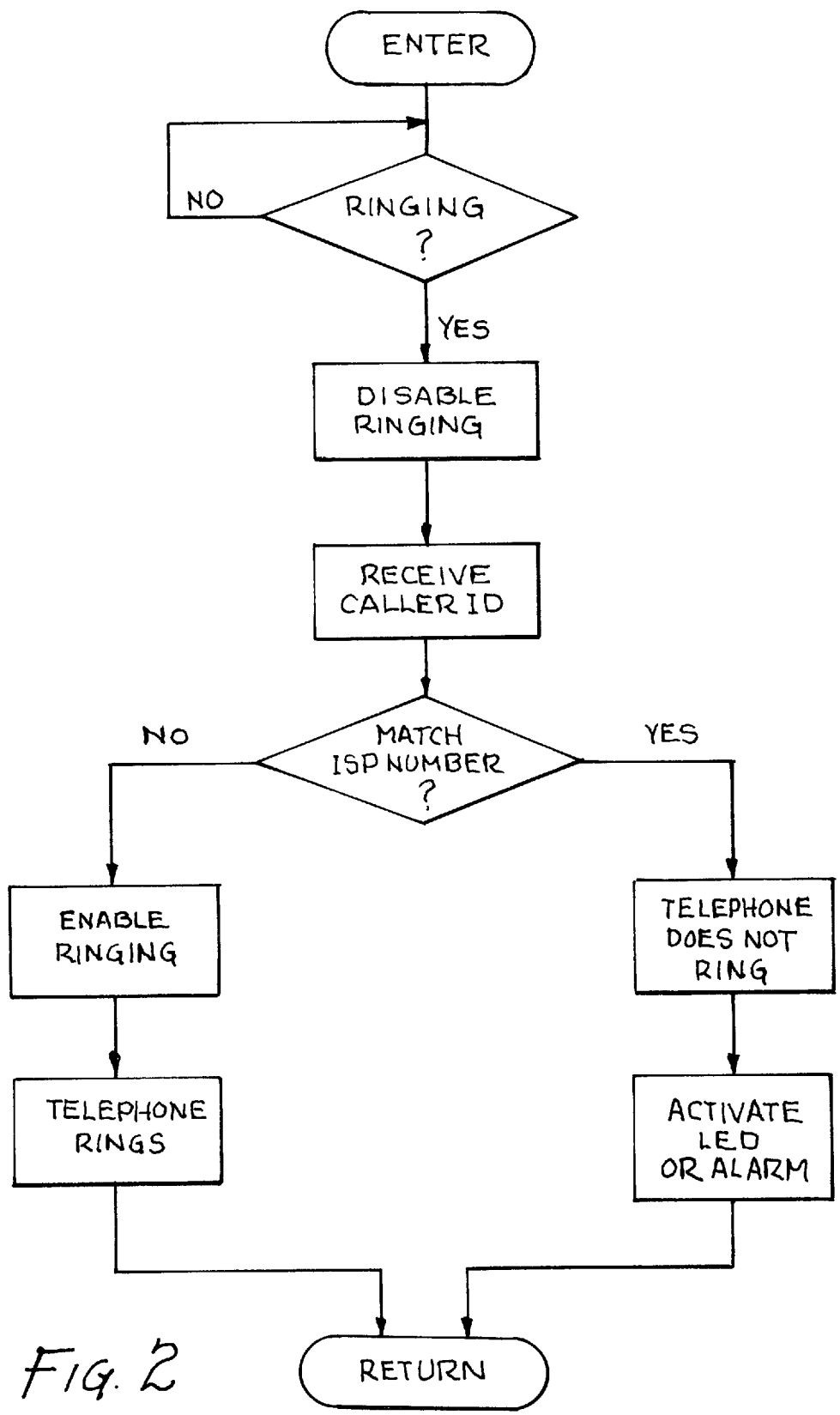
FIG. 2 is a simplified flow chart showing the operation of the intelligent caller identification apparatus depicted in FIG. 1.

Referring to FIG. 1, an intelligent caller identification apparatus (hereinafter apparatus 10) is shown. The apparatus 10 consists of a caller identification receiver 12, a ringing detector circuit 14, a ringing control circuit 16, a keypad 18, an information indicator circuit 20, incoming call memory 22, information/internet service provider (ISP) database 24, and a microcontroller 26.

The ringing detector circuit 14 is directly coupled to a telephone line 28 of a selected telephone service network 30. The ringing detector circuit 14 receives a signal over the telephone line 28 when an incoming telephone call is made to the selected telephone number to which the apparatus 10 is attached.

The configuration of the circuitry for the ringing detector circuit 14 is based on the type of telephone line 28 to which the apparatus 10 is connected. If the telephone line 28 is a digital telephone line, the ringing detector circuit 14 is comprised of a detection circuit. The detection circuit is able to detect data packets which are sent from the selected telephone service network 30 to the telephone set 31. The data packets inform the telephone set 31 that an incoming telephone call has placed to the selected telephone number. In the preferred embodiment of the present invention, if the telephone line 28 is a digital telephone line, the microcontroller 26 will act as the detection circuit.

Figure 3:
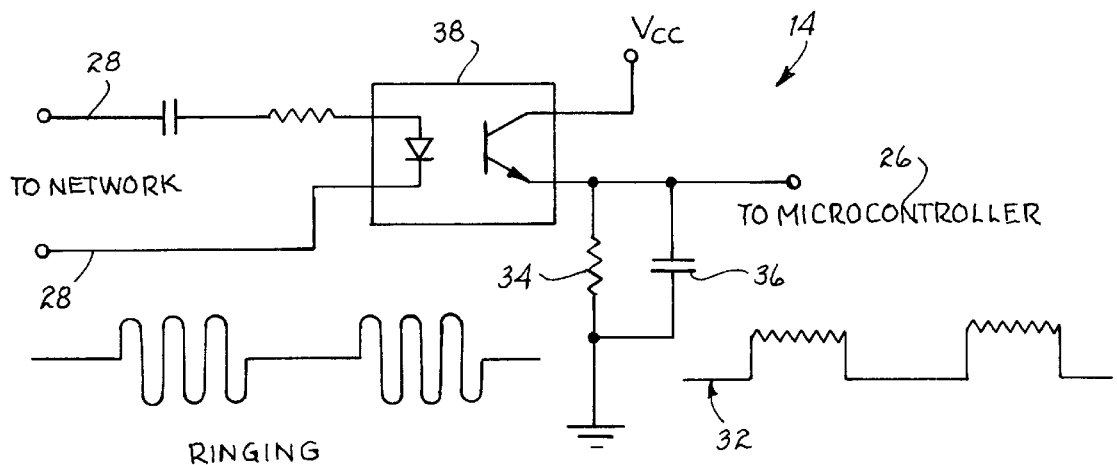
FIG. 3 is a simplified functional block diagram of the ringing detector circuit used in the intelligent caller identification apparatus depicted in FIG. 1 when the intelligent caller identification apparatus is coupled to an analog telephone line.

Referring to FIG. 3, wherein like numerals and symbols represent like elements, another embodiment of the ringing detector circuit 14 is shown. The embodiment depicted in FIG. 3 is used when the apparatus 10 is connected to a telephone line 28 which is an analog telephone line. The ringing detector circuit 14 uses a resistor capacitor (RC) circuit 32. The RC circuit 32 is used for converting a signal which is sent over the telephone line 28 when an incoming telephone call is being made to the selected telephone number. As can be seen from FIG. 3, the signal is converted from a sinusoidal like signal to a pulse signal so that the incoming telephone call may be detected by the microcontroller 26 (FIG. 1). The RC circuit 32 is basically comprised of a resistor 34 coupled in parallel to a capacitor 36. The RC circuit 32 is coupled to an optical isolator circuit 38. The optical isolator circuit 38 is used for isolating the RC circuit 32 from the telephone line 28.

Referring back now to FIG. 1, the apparatus 10 further includes a ringing control circuit 16. The ringing control circuit 16 is coupled to a telephone set 31 and also to the telephone line 28. When an incoming telephone call has been received by the ringing control circuit 16, the ringing control circuit 16 will generate a signal which will cause the telephone set 31 to ring. This will signal the user that an incoming call to the selected telephone number has been made, and that the user should answer the telephone set 31.

Like the ringing detector circuit 14, the configuration of the ringing control circuit 16 is based on whether the telephone line 28 is an analog or digital telephone line. In accordance with one embodiment of the present invention, if the telephone line 28 is a digital telephone line, the microcontroller 26 is used as a ringing control circuit 16. The microcontroller 26 will signal the telephone set 31 to ring when the data packet is sent to the microcontroller 26 indicating that a call has been placed to the selected telephone number.

Figure 4:
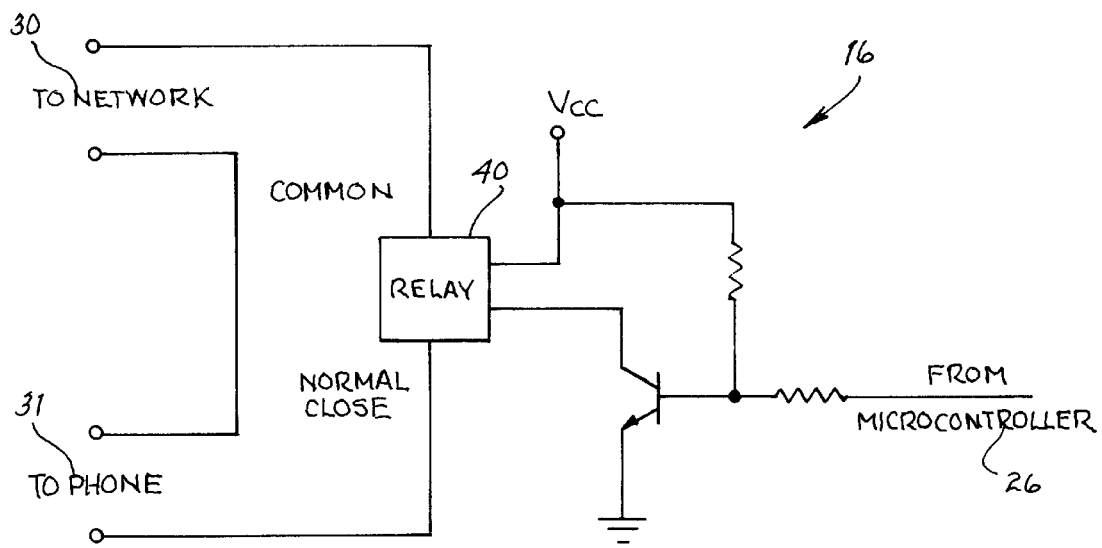
FIG. 4 is a simplified functional block diagram of the ringing control circuit used in the intelligent caller identification apparatus depicted in FIG. 1 when the intelligent caller identification apparatus is coupled to an analog telephone line.

Referring to FIG. 4 wherein like numerals and symbols represent like elements, another embodiment of the ringing control circuit 16 is shown. The embodiment depicted in FIG. 4 is used when the apparatus 10 is connected to a telephone line 28 which is an analog telephone line. As can be seen from FIG. 4, the ringing control circuit 16 is basically comprised of a normally closed relay 40. The normally closed relay 40 is controlled by the microcontroller 26 (FIG. 1). Since the relay 40 is normally closed, when an incoming call is made to the selected telephone number, the telephone call signal will be sent through the closed relay 40 to the telephone set 31. The telephone signal will cause the telephone set 31 to ring thereby indicating an incoming call.

Referring back now to FIG. 1, the apparatus 10 is further comprised of a caller identification receiver 12. The caller identification receiver 12 is also coupled to the telephone line 28. The caller identification receiver 12 is used for decoding identification information which is sent over the telephone line 28 when an incoming telephone call is placed to the selected telephone number. For an analog telephone line, the caller identification receiver 12 may be a Frequency Shift Keyed (FSK) data receiver, or a Dual Tone Multiple Frequencies (DTMF) data receiver. For a digital telephone line, the caller identification receiver 12 may be an Integrated Services Digital Network (ISDN) data receiver. Caller identification receivers 12 are known to those skilled in the art. Thus, the details of the circuitry for the caller identification receiver 12 will not be described.

The apparatus 10 is controlled by a microcontroller 26. The microcontroller 26 is coupled to the ringing detector circuit 14, the ringing control circuit 16, and the caller identification receiver 12. When an incoming telephone call is placed to the selected telephone number, the microcontroller 26 will immediately disable the ringing control circuit 16 after the ringing detector circuit 14 detects the incoming telephone call. The caller identification receiver 12 will decode the identification information from the incoming telephone call and forward this information to the microcontroller 26. The microcontroller 26 will then compare the identification information of the incoming telephone call to a list of information/internet service providers (ISPs).

The list of ISPs are stored in an ISP database 24. The ISP database 24 may be stored internally within a memory section of the microcontroller 26. The ISP database 26 may also be located external to the microcontroller 26 in a memory storage device (i.e., a nonvolatile memory storage device) which would be coupled to the microcontroller 26. The ISP database 26 generally contains a list of ISP telephone numbers and the names of the ISPs. Each telephone number may also be marked with a special ISP indication. For example, if multiple ISPs are used, the user can mark each ISP telephone number with a special name (i.e., EMAIL1, EMAIL2, EMAIL3, etc.

If the identification information of the incoming telephone call matches any telephone number in the ISP database 24, the microcontroller 26 will continue to disable the ringing control circuit 16 so that the telephone set 31 will not be able to ring. The microcontroller 26 will also generate an incoming electronic message signal. However, if the identification information of the incoming telephone call does not match any telephone number in the ISP database 24, the microcontroller 26 will enable the ringing control circuit 16 so that the ringing control circuit 16 will signal the telephone set 31 to ring thereby indicating that an incoming telephone call has been made from a noninformation service provider.

As stated above, when a match is made between the identification information and the ISP database 24, the microcontroller 26 will continue to deactivate the ringing control circuit 16. The microcontroller 26 will also generate and send an incoming message signal to an information indicator circuit 20 which is directly coupled to the microcontroller 26. The information indicator circuit 20 will signal the user of the incoming electronic communication. In accordance with one embodiment of the present invention, the information indicator circuit 20 is comprised of one or more Light Emitting Diodes (LEDs). When a match is made, a corresponding LED is lit or flashes to indicate an E-Mail message has arrived at ISP1, ISP2, ISP3, etc. The information indicator circuit 20 may also be a Liquid Crystal Display (LCD). The LCD would be used to display the identification information of the incoming telephone call as well as the time the incoming telephone call was made (i.e. ISP name, telephone number, etc). The information indicator circuit 20 may also be some type of audible alarm.

The apparatus 10 may further comprise a keypad 18. The keypad 18 would be coupled to the microcontroller 26. The keypad 18 would be comprised of a plurality of buttons or keys. The buttons/keys may be numeric, alphabetic, or alphanumeric. The keypad 18 would allow the user to program the ISP database 24 with the ISP information.

The apparatus 10 may also have an incoming call memory circuit 22. The incoming call memory circuit 22 would be coupled to the microcontroller 26. The incoming call memory circuit 22 would be used to store the identification information of incoming telephone calls to the selected telephone number. The incoming call memory circuit 22 would allow the user to review the identification information of previous telephone calls to see who has been calling the selected telephone number.

OPERATION

Referring now to FIGS. 1–4, the operation of the apparatus 10 will be described. When an incoming call is made to the selected telephone number, the ringing detection circuit 14 will signal the microcontroller 26 of the incoming telephone call. For an analog telephone line the RC circuitry 32 will convert the incoming telephone call signal to a pulse signal for detection by the microcontroller 26. For a digital telephone line, the microcontroller 26 will detect a data packet from the selected telephone service network 30 indicating an incoming telephone call.

Upon detection of the incoming telephone call, the microcontroller 26 will immediately deactivate the ringing control circuit 16. For an analog telephone line, the microcontroller 26 will open the normally closed relay 40 to disconnect the telephone set 31 from the telephone line 28 thereby disabling the ringing of the telephone set 31. For a digital telephone line, the microcontroller 26 will not send a signal to the ringing circuit of the telephone set 31.

The incoming telephone call signal will also be received by the caller identification receiver 12. The caller identification receiver 12 will decode the identification information of the incoming telephone call and forward the identification information to the microcontroller 26. The microcontroller 26 will compare the identification information of the incoming call to the data stored in the ISP database 24. If the telephone number of the incoming telephone call matches a telephone number stored in the ISP database 24, the microcontroller 26 will continue to deactivate the ringing control circuit 16. The microcontroller 26 will also generate and send an incoming message signal to the information indicator circuit 20. The information indicator circuit 20 will then visually or audibly indicate to the user that an ISP has called and that the user has an electronic message waiting for him or her. If the telephone number of the incoming telephone call does not match a telephone number stored in the ISP database 24, the microcontroller 26 will activate the ringing control circuit 16. The ringing control circuit 16 will send a signal to the telephone set 31 allowing the telephone set to ring. The user will then know that the incoming call is from a noninformation service provider and may answer the telephone call.

While the invention has been particularly shown and described with reference to preferred embodiments thereof, it will be understood by those skilled in the art that the foregoing and other changes in form, and details may be made therein without departing from the spirit and scope of the invention.

I claim:

1. An intelligent caller identification apparatus for notifying a selected telephone number of the arrival of special information comprising, in combination:

a ringing detector circuit coupled to a telephone line of a selected telephone service provider for receiving an incoming telephone call which has been made to said selected telephone number;

a ringing control circuit coupled to a telephone set and to said telephone line for signalling said telephone set to ring when said incoming call to said selected telephone number has been received;

a caller identification receiver coupled to said telephone line for decoding identification information of said incoming telephone call to said selected telephone number;

a microcontroller coupled to said ringing detector circuit, said ringing control circuit, and said caller identification receiver for disabling said ringing control circuit immediately after said ringing detector circuit detects said incoming telephone call to said selected telephone number;

an ISP Database coupled to said microcontroller for storing a list of information service providers for enabling said microcontroller to compare said identification information of said incoming telephone call to a list of information service providers; and said microcontroller further generates an incoming message signal and continues to disable said ringing control circuit when said identification information of said incoming telephone call matches data of at least one information service provider on said list of information service providers otherwise said microcontroller enables said ringing control circuit to signal said telephone set to ring to indicate said incoming telephone call is from a noninformation service provider.

2. An intelligent caller identification apparatus in accordance with claim 1 further comprising a memory storage device coupled to said microcontroller for programmably storing said list of information service providers.

3. An intelligent caller identification apparatus in accordance with claim 1 further comprising a keypad having plurality of key switches coupled to said microcontroller for inputting said list of information service providers.

4. An intelligent caller identification apparatus in accordance with claim 1 further comprising an information waiting indicator circuit coupled to said microcontroller for receiving said incoming message signal from said microcontroller and for indicating arrival of special information when said identification information of said incoming telephone call matches data of at least one information service provider on said list of information service providers.

5. An intelligent caller identification apparatus in accordance with claim 4 wherein said information waiting indicator circuit comprises at least one Light Emitting Diode (LED) for visually indicating arrival of special information when said identification information of said incoming telephone call matches data of at least one information service provider on said list of information service providers.

6. An intelligent caller identification apparatus in accordance with claim 4 wherein said information waiting indicator circuit comprises a Liquid Crystal Display (LCD) for visually indicating arrival of special information when said identification information of said incoming telephone call matches data of at least one information service provider on said list of information service providers.

7. An intelligent caller identification apparatus in accordance with claim 6 wherein said LCD displays a time when said identification information of said incoming telephone call matches data of at least one information service provider on said list of information service providers and a telephone number of said information service provider which matches said data of said incoming telephone call.

8. An intelligent caller identification apparatus in accordance with claim 4 wherein said information waiting indicator circuit comprises an audio alarm for audibly signalling arrival of special information when said identification information of said incoming telephone call matches data of at least one information service provider on said list of information service providers.

9. An intelligent caller identification apparatus in accordance with claim 1 further comprising an incoming call memory device for storing said identification information of said incoming telephone call to said selected telephone number.

10. An intelligent caller identification apparatus in accordance with claim 1 wherein said caller identification receiver is a Frequency Shift Keyed (FSK) data receiver when said telephone line is an analog telephone line.

11. An intelligent caller identification apparatus in accordance with claim 1 wherein said caller identification receiver is a Dual Tone Multiple Frequencies (DTMF) data receiver when said telephone line is an analog telephone line.

12. An intelligent caller identification apparatus in accordance with claim 1 wherein said caller identification receiver is a Integrated Services Digital Network (ISDN) data receiver when said telephone line is a digital telephone line.

13. An intelligent caller identification apparatus in accordance with claim 1 wherein for an analog telephone line said ringing detector circuit comprises:

resistor capacitor (RC) circuitry means for converting a ringing signal from said incoming telephone call to said selected telephone number to a pulse signal for detection of said incoming telephone call by said microcontroller; and optical isolator circuit for isolating said RC circuitry means from said telephone line.

14. An intelligent caller identification apparatus in accordance with claim 1 wherein for a digital telephone line said ringing detector circuit comprises means for detecting a data packet from said telephone service provider over said telephone line to inform said ringing control circuit to signal said telephone set to ring.

15. An intelligent caller identification apparatus in accordance with claim 1 wherein for an analog telephone line said ringing control circuit comprises a normally closed relay coupled to said microcontroller wherein said microcontroller opens said normally closed relay to disable said telephone set from ringing when said incoming telephone call is detected, said microcontroller continuing to open said normally closed relay if identification information of said incoming telephone call matches data of at least one information service provider on said list of information service providers, otherwise said microcontroller closing said normally closed relay for enabling said telephone set to ring to indicate said incoming telephone call is from said noninformation service provider.

16. An intelligent caller identification apparatus in accordance with claim 1 wherein for a digital telephone line said ringing control circuit comprises said microcontroller for disabling said telephone set from ringing when said incoming telephone call is detected, said microcontroller continuing to disable said telephone set from ringing if identification information of said incoming telephone call matches data of at least one information service provider on said list of information service providers, otherwise said microcontroller enabling said telephone set to ring to indicate said incoming telephone call is from said noninformation service provider.

17. An intelligent caller identification apparatus for notifying a selected telephone number of the arrival of special information comprising, in combination:

a ringing detector circuit coupled to a telephone line of a selected telephone service provider for receiving an incoming telephone call which has been made to said selected telephone number;

a ringing control circuit coupled to a telephone set and to said telephone line for signalling said telephone set to ring when said incoming call to said selected telephone number has been received;

a caller identification receiver coupled to said telephone line for decoding identification information of said incoming telephone call to said selected telephone number;

a microcontroller coupled to said ringing detector circuit, said ringing control circuit, and said caller identification receiver for disabling said ringing control circuit immediately after said ringing detector circuit detects said incoming telephone call to said selected telephone number;

an ISP Database coupled to said microcontroller for storing a list of information service providers for enabling said microcontroller to compare said identification information of said incoming telephone call to a list of information service providers;

a memory storage device coupled to said microcontroller for programmably storing said list of information service providers;

a keypad having a plurality of key switches coupled to said microcontroller for inputting said list of information service providers;

and an information waiting indicator circuit coupled to said microcontroller for receiving said incoming message signal from said microcontroller and for visually indicating arrival of special information when said identification information of said incoming telephone call matches data of at least one information service provider on said list of information service providers;

an incoming call memory device for storing said identification information of said incoming telephone call to said selected telephone number; and said microcontroller further generates an incoming message signal and continues to disable said ringing control circuit when said identification information of said incoming telephone call matches data of at least one information service provider on said list of information service providers otherwise said microcontroller enables said ringing control circuit to signal said telephone set to ring to indicate said incoming telephone call is from a noninformation service provider.

18. An intelligent caller identification apparatus in accordance with claim 17 wherein said information waiting indicator circuit comprises at least one Light Emitting Diode (LED) for visually indicating arrival of special information when said identification information of said incoming telephone call matches data of at least one information service provider on said list of information service providers.

19. An intelligent caller identification apparatus in accordance with claim 17 wherein said information waiting indicator circuit comprises a Liquid Crystal Display (LCD) for visually indicating arrival of special information when said identification information of said incoming telephone call matches data of at least one information service provider on said list of information service providers.

20. An intelligent caller identification apparatus in accordance with claim 19 wherein said LCD displays a time when said identification information of said incoming telephone call matches data of at least one information service provider on said list of information service providers and a telephone number of said information service provider which matches said data of said incoming telephone call.

21. An intelligent caller identification apparatus in accordance with claim 1 wherein said intelligent caller identification apparatus is directly built into said telephone set and said ringing control circuit comprises said microcontroller for disabling said telephone set from ringing when said incoming telephone call is detected, said microcontroller continuing to disable said telephone set from ringing if identification information of said incoming telephone call matches data of at least one information service provider on said list of information service providers, otherwise said microcontroller enabling said telephone set to ring to indicate said incoming telephone call is from said noninformation service provider.

* * * * *